(12) United States Patent
Egawa et al.

(10) Patent No.: US 7,515,991 B2
(45) Date of Patent: Apr. 7, 2009

(54) SELF-PROPELLED CLEANING DEVICE AND METHOD OF OPERATION THEREOF

(75) Inventors: Saku Egawa, Toride (JP); Yutaka Arai, Chiyoda (JP); Ryoko Ichinose, Tsukuba (JP); Yasuhiro Asa, Chiyoda (JP); Hirofumi Tanaka, Shiroyama (JP)

(73) Assignees: Hitachi, Ltd., Tokyo (JP); Hitachi Home and Life Solutions, Inc., Tokyo (JP)

( * ) Notice: Subject to any disclaimer, the term of this patent is extended or adjusted under 35 U.S.C. 154(b) by 692 days.

(21) Appl. No.: 10/801,861

(22) Filed: Mar. 17, 2004

(65) Prior Publication Data

US 2004/0181896 A1    Sep. 23, 2004

(30) Foreign Application Priority Data

Mar. 17, 2003   (JP)   ............................. 2003-071206

(51) Int. Cl.
*G06F 19/00*    (2006.01)

(52) U.S. Cl. ........................... 700/245; 700/56; 700/61; 701/23; 15/1.7; 15/98; 15/300.1; 15/319; 318/568.12

(58) Field of Classification Search ................ 700/245, 700/56, 61; 15/319, 98, 300.1, 1.7; 318/568.12; 701/23

See application file for complete search history.

(56) References Cited

U.S. PATENT DOCUMENTS

| | | | | |
|---|---|---|---|---|
| 5,284,522 A | * | 2/1994 | Kobayashi et al. | 134/18 |
| 5,293,955 A | * | 3/1994 | Lee | 180/169 |
| 5,568,589 A | * | 10/1996 | Hwang | 706/52 |
| 5,634,237 A | * | 6/1997 | Paranjpe | 15/319 |
| 6,119,057 A | * | 9/2000 | Kawagoe | 701/23 |
| 6,553,612 B1 | * | 4/2003 | Dyson et al. | 15/340.1 |
| 6,671,592 B1 | * | 12/2003 | Bisset et al. | 701/23 |
| 2002/0138936 A1 | * | 10/2002 | Takeuchi et al. | 15/319 |
| 2003/0025472 A1 | * | 2/2003 | Jones et al. | 318/568.12 |
| 2003/0102014 A1 | * | 6/2003 | Yoshino | 134/21 |
| 2004/0255425 A1 | * | 12/2004 | Arai et al. | 15/300.1 |
| 2005/0204505 A1 | * | 9/2005 | Kashiwagi | 15/319 |
| 2005/0235444 A1 | * | 10/2005 | Gerber et al. | 15/98 |
| 2006/0283328 A1 | * | 12/2006 | Saiki et al. | 96/289 |
| 2008/0007193 A1 | * | 1/2008 | Jones et al. | 318/568.12 |

FOREIGN PATENT DOCUMENTS

JP    2-287708    11/1990

(Continued)

*Primary Examiner*—Khoi Tran
*Assistant Examiner*—Jorge O Peche
(74) *Attorney, Agent, or Firm*—Antonelli, Terry, Stout & Kraus, LLP.

(57) ABSTRACT

In cleaning using a self-propelled cleaning device, firstly the cleaning device moves alongside a wall surface and then a reference direction is set. Next, the cleaning device advances alongside the wall surface at a prescribed distance, makes a right-angle turn, and travels in the reference direction. When the cleaning device reaches the surface of an opposing wall, it moves in a spiraling manner. At that time, the orientation angle of the cleaning device, which is estimated using a gyro sensor, is checked and corrected. If an obstacle is encountered while traveling, the cleaning device travels on a path that avoids the obstacle or travels in a spiral manner in a region in front of the obstacle.

16 Claims, 6 Drawing Sheets

FOREIGN PATENT DOCUMENTS

| | | |
|---|---|---|
| JP | 5-257533 | 10/1993 |
| JP | 7-171069 | 7/1995 |
| JP | 8-215116 | 8/1996 |
| JP | 10-320045 | 12/1998 |
| JP | 2002-204768 | 7/2002 |
| JP | 2003310509 A * | 11/2003 |

* cited by examiner

SELF-PROPELLED CLEANING DEVICE AND METHOD OF OPERATION THEREOF

BACKGROUND OF THE INVENTION

The present invention relates to a self-propelled cleaning device and to a method of operation thereof.

An example of a self-propelled cleaning device has been disclosed in Japanese Application Patent Laid-Open Publication No. Hei 08-215116. In the cleaning device described in this publication, the state of the wall in front of the cleaning device body is checked at each forward stop position. A determination is made as to whether or not there is a continuous flat surface in front of the body; and, in the case where there is a flat surface, the body is moved so as to be at right angles with respect to the flat surface, and the zero point for the orientation sensor is set.

Another example of a self-propelled cleaning device is disclosed in Japanese Application Patent Laid-Open Publication No. 2002-204768. The cleaning device disclosed in this publication comprises a propelling means for moving the body; a moving direction changing means for changing the direction in which the body moves; and a movement controlling means for controlling the movement of the body. The movement controlling means causes the cleaning device body to zigzag within a region defined by a pair of straight lines. When the cleaning device body cannot spiral any further forward, the advancing direction of the body is changed so as to be directed away from the regional line obstructing the spiral advance. It is to be noted that this cleaning device body comprises an obstacle detection means for detecting an obstacle positioned in the advancing direction of the cleaning device body; and, when an obstacle is detected, the advancing direction of the cleaning device is changed to a direction that avoids the obstacle.

In the above-mentioned cleaning device disclosed in Japanese Application Patent Laid-Open Publication No. Hei 08-215116, a wall in front of the body is detected, the body is positioned at right angles to the wall and the zero point for the orientation sensor is set. However, with this method, while the direction can be detected when the wall is a substantially flat surface, when the wall is uneven, it may not be possible for the angle of the wall to be accurately detected. In addition, when obstacles, such as chairs or desks, are within the region to be cleaned, the path of movement must be changed in order to avoid such obstacles, but sufficient consideration is not given to the disclosed in this method.

Meanwhile, in the self-propelled cleaning device disclosed in Japanese Application Patent Laid-Open Publication No. 2002-204768 mentioned above, when obstacles are detected, the direction of movement is changed to avoid the obstacles. However, in this type of simple system for avoiding an obstacle, even when small obstacles are encountered, there is a great change in the path of movement, and this causes large regions to be left uncleaned. As a result, there are regions that are not cleaned, and thus there is the possibility that it may become necessary to clean the uncleaned regions again, resulting in a low cleaning efficiency.

SUMMARY OF THE INVENTION

This invention was developed in view of the shortcomings in the above-described technology, and the object thereof is to allow quick cleaning without leaving uncleaned regions when cleaning is carried out with a self-propelled cleaning device.

One feature of this invention for achieving the object described above is characterized in that the autonomous self-propelled cleaning device comprises: a moving means for moving the cleaning device; a control means for controlling the moving means; an orientation angle detection means for detecting the orientation angle of the cleaning device; and a wall surface detection means which is capable of detecting a wall surface at a position on one side of the cleaning device, so that when the control means causes the cleaning device to travel alongside a wall surface detected by the wall surface detection means that partitions the room to be cleaned, a rectangular travel path is determined based on an orientation angle detected by the orientation angle detection means, and the driving means drives the cleaning device such that it moves along this travel path.

This autonomous self-propelled cleaning device is preferably one which comprises an obstacle detection means for detecting an obstacle at a position in front of the cleaning device; and, if the obstacle detection means detects an obstacle on the travel path, the control means controls the moving means such that the obstacle is avoided. More preferably, the control means controls the moving means such that, if the obstacle detection means detects an obstacle in the advancing direction of the cleaning device, the cleaning device moves alongside the right-side or left-side of the obstacle such that the obstacle is avoided. Also, the self-propelled cleaning device may be one which comprises a map recording means capable of storing information concerning the region to be cleaned, and the control means determines a rectangular travel path based on the information recorded in the map recording means.

Another feature of this invention for achieving the object described above is characterized in that the method for operating the self-propelled cleaning device capable of autonomous movement comprises the steps of: causing the cleaning device to travel along a plurality of looped travel paths, including travel routes along a pair of opposing wall surfaces; detecting a reference direction for the self-propelled cleaning device on at least one of the travel routes along the wall surface; and determining a travel path, other than the travel routes along the wall surface, based on the reference direction.

Also, in this method, the looped travel path may comprise a first vertical movement path that is substantially orthogonal with respect to the travel route along the wall surface, and a second vertical movement path, and the interval between these two movement paths is an odd-number multiple of half of the interval between the two continuous rectangular travel paths, and the interval between the two continuous rectangular travel paths should be between 1 and 2 times the width cleanable by the cleaning means.

Yet another feature of this invention for achieving the object described above is characterized by a method of operation for a self-propelled cleaning device comprising a moving means for moving the cleaning device on a floor surface; a control means for controlling the moving means; and a cleaning means for cleaning the floor surface, wherein the method of operation comprises the steps of: finding the wall surface prior to the start of cleaning using one of right-side tracking and left-side tracking alongside the wall surface; and, when the wall surface is found, performing cleaning based on information detected by an orientation angle detection means for detecting the orientation angle of the cleaning device, and a wall surface detection means for detecting the position of the wall surface, so that the cleaning device takes a plurality of spiral travel paths which partially overlap with each other.

In this method, the spiral travel path may comprise: a first horizontal movement path alongside a first wall surface segment forming the wall surface; a first vertical movement path that is continuous with the first horizontal path; a second horizontal movement path that is continuous with the first vertical movement path alongside the second wall surface segment opposing the first wall surface segment and; a second vertical movement path that is continuous with the second horizontal movement path. It is also preferable that the cleaning device travels on at least the first or second horizontal movement path, and the orientation angle detection means detects the orientation angle and sets the directions of the first and second vertical movement paths based on the detected orientation angle, and the orientation angle is continually corrected using the orientation angle detected by the orientation angle detection means when the cleaning device is caused to travel on the first horizontal movement path, and the orientation angle of the first wall surface segment stored in the map recording means that stores wall surface information. Further, the cleaning device tracks around the wall surface before cleaning begins, and wall surface information is stored in the map recording means based on the wall surface information detected at the time of tracking.

Yet another feature of this invention for achieving the object described above is characterized by a method for operating a self-propelled cleaning device which uses an orientation angle detection means and a wall surface detection means, which detects a wall surface, to clean regions enclosed by a plurality of wall surface segments, the method comprising: a first step of moving the cleaning device in a prescribed direction until it approaches an obstacle or a wall surface segment; a second step of moving the cleaning device such that one of the right-side and left-side of the cleaning device approaches the object and then the cleaning device tracks around the object; a third step of comparing the direction after successive changes in the orientation direction detected by the orientation direction detection means with the prescribed direction; and a fourth step of rotating the cleaning device by a prescribed angle when the difference between the direction after cumulative changes and the prescribed direction in the third step is within a preset allowable range, and then repeating the process from the first step.

DETAILED DESCRIPTION OF THE INVENTION

Figure 1:
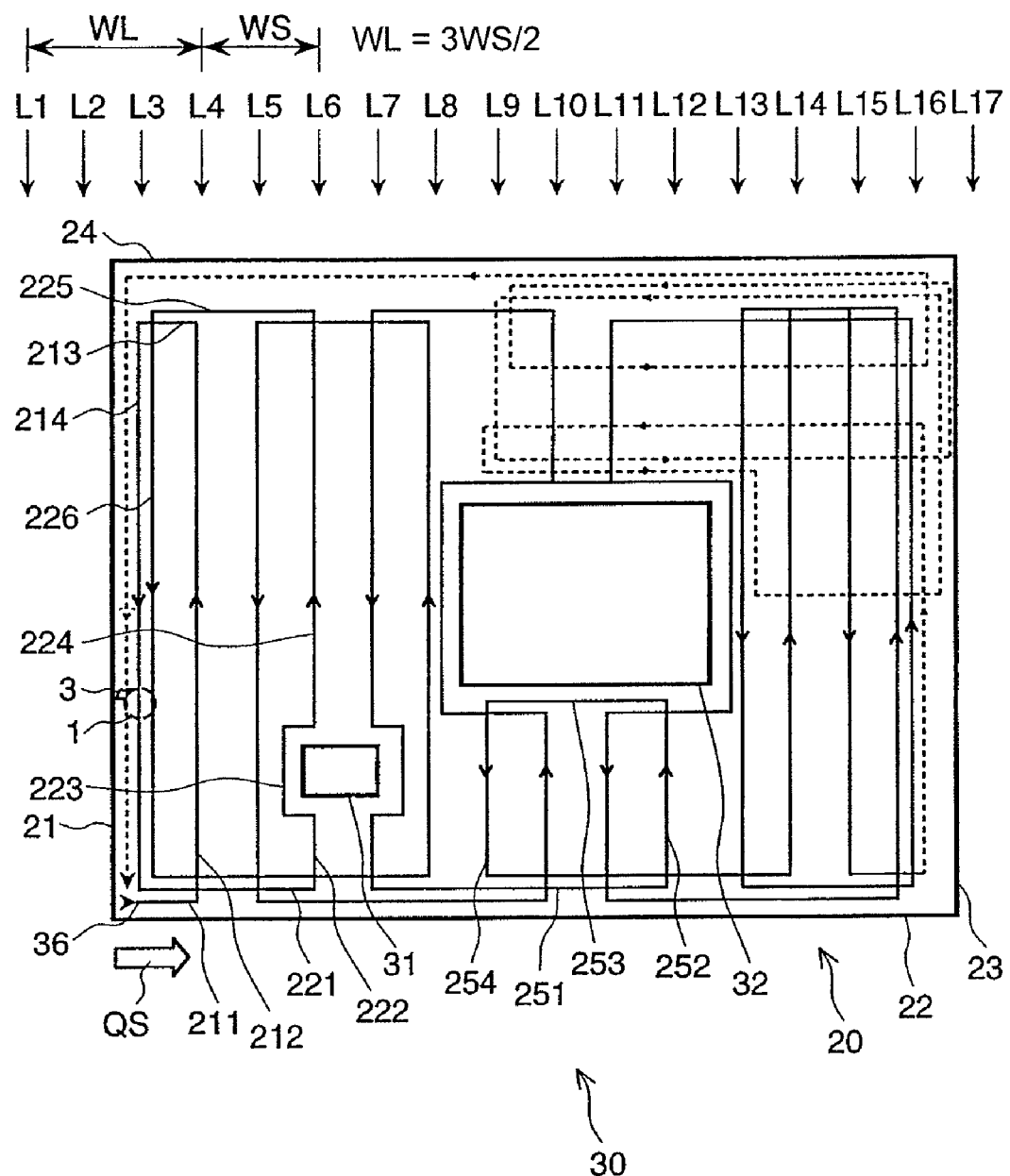
FIG. 1 is a diagram of an example of the travel path of the self-propelled cleaning device of this invention.

One embodiment of the self-propelled cleaning device of this invention and the method of operation thereof will be described with reference to the drawings. FIG. 1 is a diagram showing the cleaning of a region using the self-propelled cleaning device of this invention, and FIG. 2 shows a top surface cross-sectional view and a side surface cross-sectional view of the embodiment of a self-propelled cleaning device used for the cleaning shown in FIG. 1.

Figure 2:
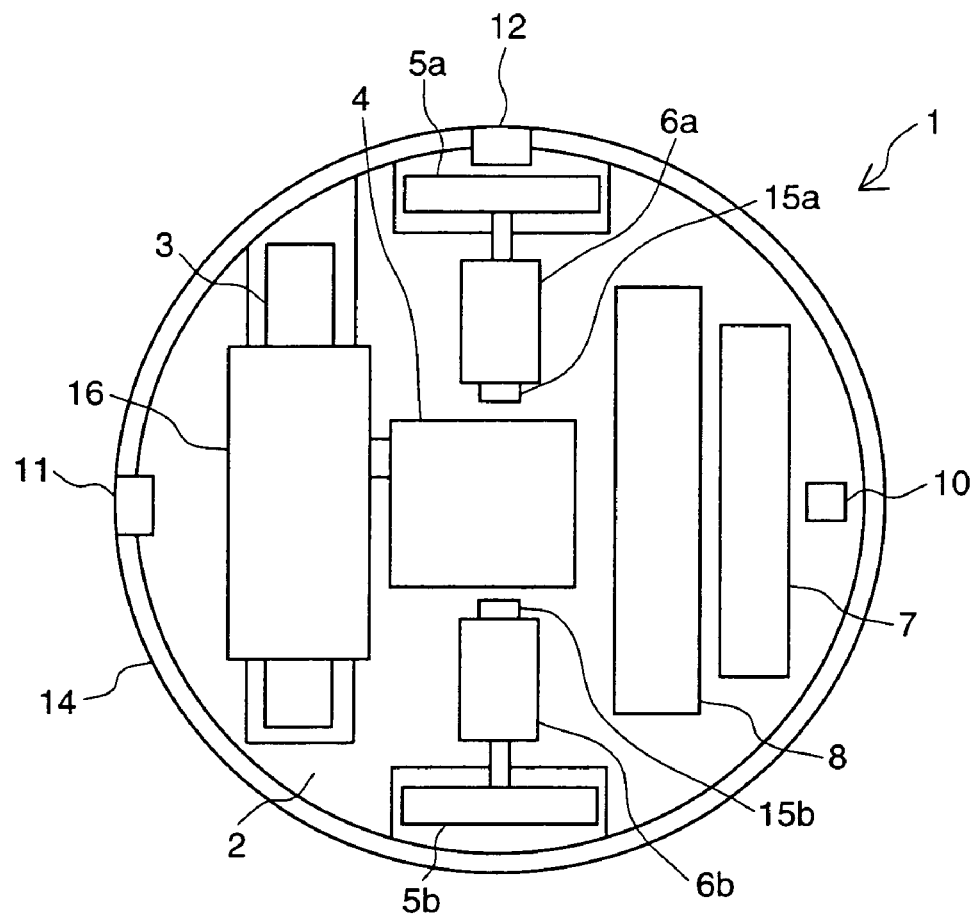
FIG. 2 is a diagram which shows a top surface view and a side surface view of an embodiment of a self-propelled cleaning device of this invention.
Figure 2:
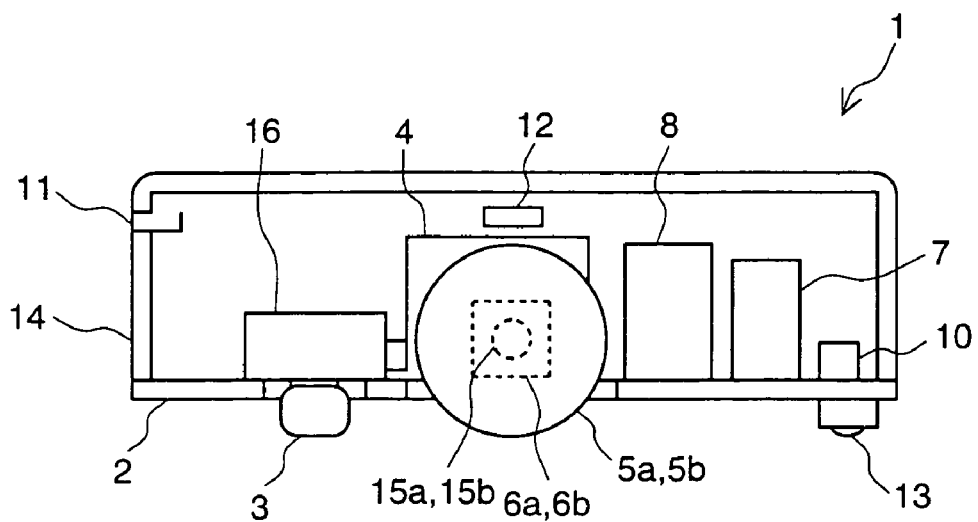

In FIG. 2, the self-propelled cleaning device 1 is oriented for travel from the right side to the left side. The self-propelled cleaning device 1 comprises a body 2 and a remote control, which is not shown. The body 2 comprises: a base 2a; a battery 8, which is mounted on the base 2a; a suction inlet 3 that is located at a position on the front portion of base 2a and used when the floor surface is being cleaned; a dust collecting device 4 mounted on the base 2a for sucking dust from the suction inlet 3; a pair of left and right wheels 5a and 5b that are used when the body 2 moves on the floor surface; motors 6a and 6b that drive the wheels 5a and 5b, respectively, and are mounted on the base 2a; and a control device 7 that controls the movement of the body 2 and is mounted on the base 2a. Rotary encoders 15a and 15b, that detect the rotating speed of the wheels, are mounted on the left and right motors 5a and 5b, respectively. A caster 13 that supports the base 2a is mounted to the lower surface of the base 2a at the rear side. A circular cover 14 that serves as a hood is mounted onto the outer circumferential portion of the body 2.

The control device 7 supplies control commands to the motors 5a and 5b independently. The control device 7 controls the speed and direction of rotation of each of the motors 5a and 5b, thus causing the body to advance, retreat or rotate on the floor surface. The suction inlet 3 is made to contact the floor surface, and the dust collecting device 4 sucks up the dust on the floor surface. In order for cleaning with the suction inlet to be carried out all the way to the wall, the suction inlet 3 is movable toward the right side of the body 2, and a suction inlet moving mechanism 16 for causing the suction inlet to protrude is provided at a position corresponding to the suction inlet 3 on the upper surface of the base 2a.

A gyro 10 is mounted on the rear end of the base 2a. The gyro 10 is an angular velocity sensor, such as a piezoelectric vibrating gyro, and it detects the speed of rotation of the body 2 on the floor surface. The control device 7 integrates the detected angular velocity to thereby obtain the orientation angle Q. More specifically, the orientation angle Q is calculated as described in the following. The previous orientation angle Q is stored in the control device 7 as the stored orientation angle value Qm. The product of the angular velocity detected by the gyro 10 and the time elapsed since the previous orientation angle calculation is added to the stored orientation angle value Qm, and this is used as the present orientation angle. In addition, the stored orientation angle value Qm is replaced by the orientation angle value thus obtained.

The upper front-most portion of the cover 14 has a front proximity sensor 11 for detecting obstacles in front of the cleaning device. Also, a side proximity sensor 12 for detecting a wall surface at the right side of the cleaning device 1 is provided on the surface of the cover 14 above the right wheel 5a. The distance to the object facing the sensors 11 and 12 is detected using light reflected when infrared beams emitted from the sensors 11 and 12 hit the object. Contact sensors also may be used together with the sensors 11 and 12 in order to ensure detection of the object. The side proximity sensor 12 may be provided on the right or left side in accordance with the travel direction along the wall. In this embodiment, the body 2 does right-side wall tracking (referred to as right tracking), and thus the side proximity sensor 12 is located on the right side of the body 2.

The control device 7 drives the motors 5a and 5b based on information detected by the rotary encoders 15a and 15b, the gyro 10, the front proximity sensor 11 and the side proximity sensor 12, and it thereby controls movement of the body 2. The control device 7 is a computer system for control that comprises a CPU, a memory and input and output circuits. A computer program is stored in the memory for carrying out the operation algorithm of the control device 7. A portion of the memory of the control device 7 also is used to store map information.

The self-propelled cleaning device 1 having this structure advances in the forward direction while cleaning an area corresponding to the width of the suction inlet 3. At this time, the cleaning device 1 of this invention is caused to advance along a spiral path, thus progressively reducing the region that is uncleaned. This will be described with reference to FIG. 1. It is to be noted that in the following description, the walls and doors that define the outer periphery of the region within the room where the self-propelled cleaning device 1 may move are referred to as a "wall surface".

The wall surface includes the walls and doors which constitute the boundary of the room, as well as the furniture, such as shelves, which are placed along the wall. In the case where there is an opening into the room, markers, such as magnetic tape or light beams, are put at the opening so that the self-propelled cleaning device 1 does not go outside of the room, and the wall surface also includes the temporary wall defined by these markers. The four wall surfaces of the room are divided into four separate surfaces. These are called wall segments. Chairs, desks and the like that are arranged at positions spaced from the wall surface of the inner walls of the room, and for which the region where they are placed cannot be cleaned, are referred to as "obstacles".

Figure 6:
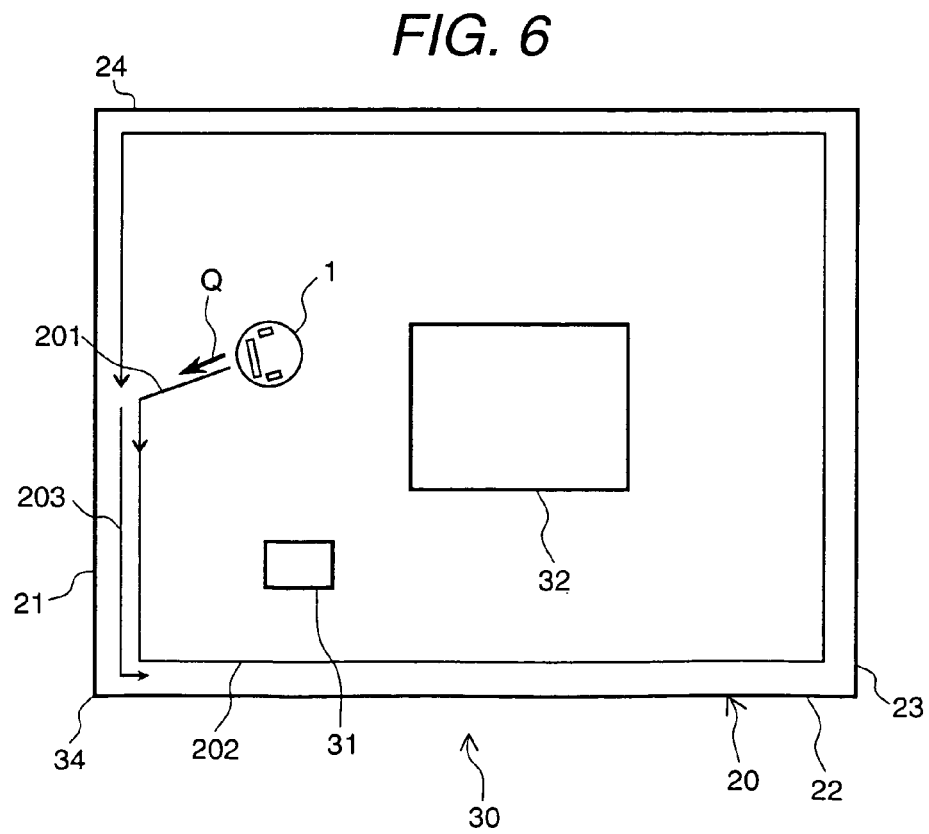
FIG. 6 through FIG. 8 are diagrams which illustrate the travel path of the self-propelled cleaning device.

FIG. 1 and FIG. 6 show examples of the travel path of the self-propelled cleaning device 1 inside the room. The room 30 that is to be cleaned is enclosed by a wall 20 that has four wall segments (21, 22, 23 and 24). Obstacles, such as a chair 31 and a sofa 32, are arranged in the room 30. The self-propelled cleaning device 1 is placed initially at a suitably selected position in the room 30. First, the region for cleaning is checked. This is shown in FIG. 6. The cleaning device is made to advance in the current direction Q, along the path 201, until it gets to the wall surface 20. Next the self-propelled cleaning device 1 takes the paths 202 and 203 as it travels around the room 30 along the wall 20. The total region to be cleaned is defined by this motion, and this completes the preparatory operations.

Next, the process moves to the cleaning operation. Because the region to be cleaned has been defined, the cleaning begins as shown in FIG. 1. At the time of cleaning, the self-propelled cleaning device 1 first travels along the wall surface segment 21. Next, it switches to the spiral cleaning mode taking the path of a rectangular loop. In the spiral cleaning mode, when the obstacles 31 and 32 are encountered, the cleaning device is moved to the inside of the loop along the obstacle. For example, the obstacle 31 is avoided by taking path 223. Next, it moves to the adjacent loop, and the adjacent portion that was left uncleaned is then cleaned.

Figure 3:
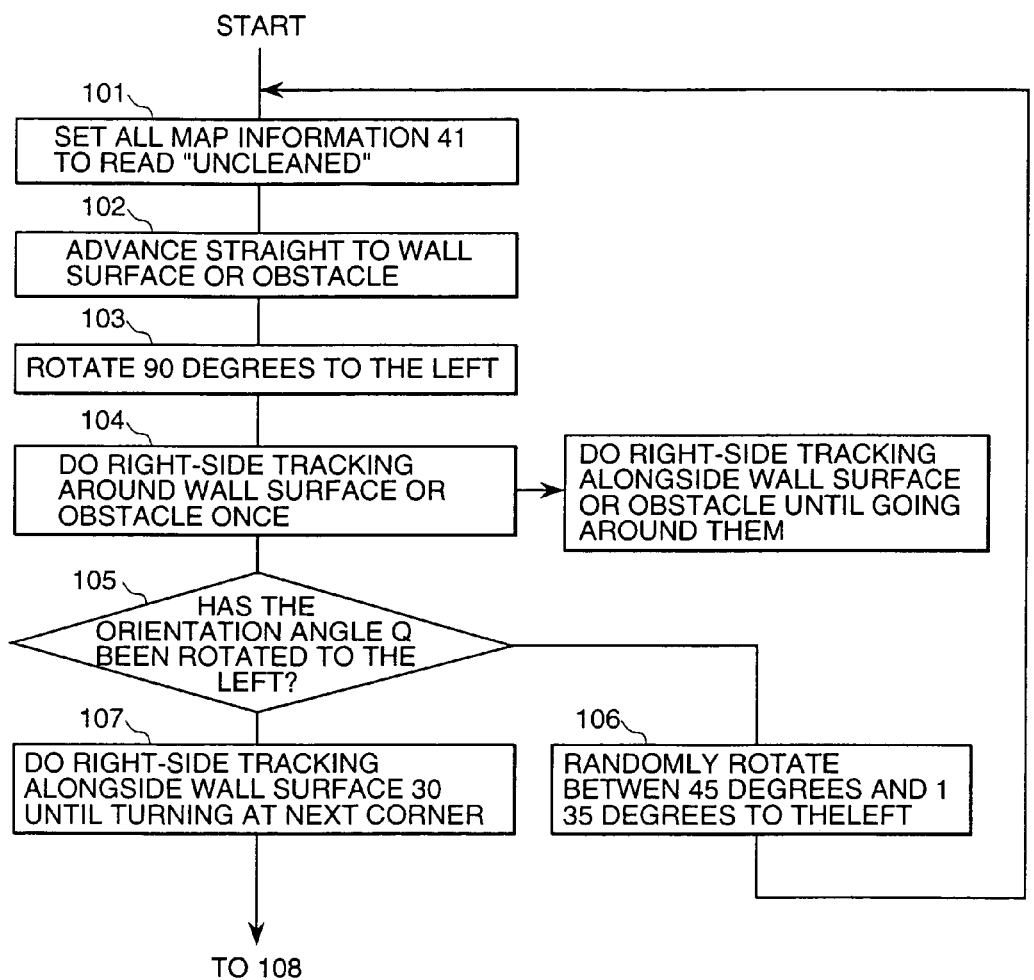
FIG. 3 and FIG. 4 show flowcharts of the method of operation of a self-propelled cleaning device of this invention.
Figure 4:
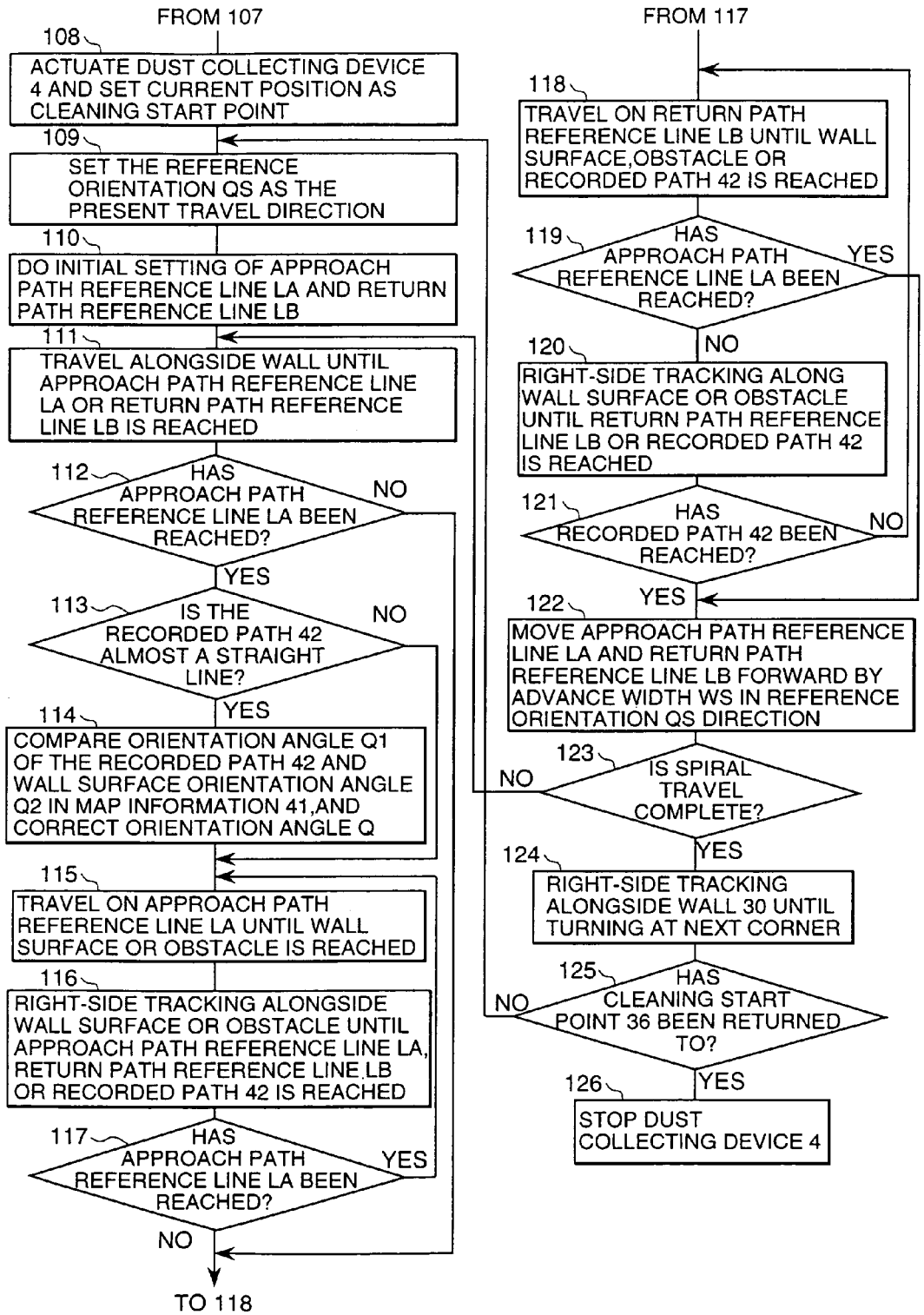

The following is a description of the control algorithm of the self-propelled cleaning device 1 using the flowcharts shown in FIG. 3 and FIG. 4. FIG. 3 shows the details of the preparatory operations, while FIG. 4 shows the details of the cleaning operations. In Step 101, all locations on the map information 41 that are stored in the memory of the control device 7 are marked "unconfirmed".

Figure 5:
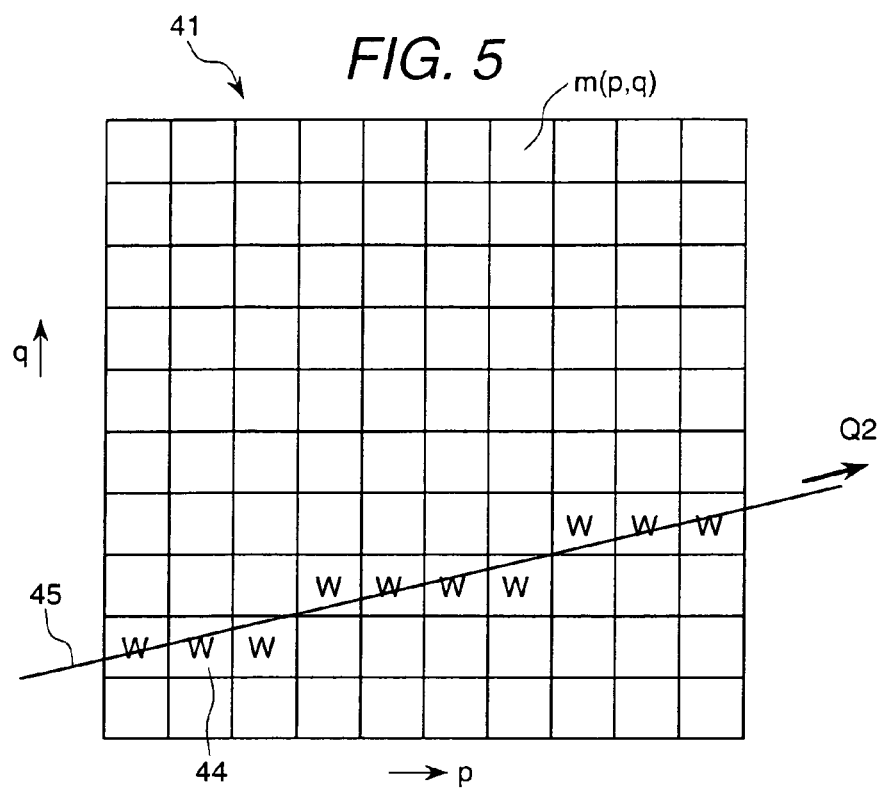
FIG. 5 is a diagram illustrating the map information used in the self-propelled cleaning device.

The map information 41 is shown in detail in FIG. 5. The map information 41 is a two-dimensional array of data. The floor surface that includes the region to be cleaned is divided into cells having prescribed intervals, and a small region is formed. The array elements m(p, q) are made to correspond with each of the small regions. One of the indicators "unconfirmed", "wall surface", "cleaning complete" or "obstacle" is written in each of the array elements m(p, q). In FIG. 5, the wall surface indicator in the array element 44 is designated by the letter "W". Empty array elements are "unconfirmed". The cell interval is set based on the size of the room to be cleaned, as well as the accuracy with which the cleaning device is desired to travel, the memory capacity, the calculation speed and the like, and the interval may, for example, be 1 cm.

In Step 102, the drive motors 6a and 6b for the left and right wheels 5a and 5b are driven. When the front proximity sensor 11 detects a wall surface or an obstacle, the self-propelled cleaning device 1 is advanced straight ahead until it approaches the wall surface or the obstacle and comes into proximity therewith. The extent of the approach is pre-set. When the self-propelled cleaning device 1 reaches the pre-set approach position, in Step 103, the self-propelled cleaning device 1 rotates 90 degrees to the left. The side proximity sensor 12, which is disposed on the right side of the self-propelled cleaning device 1, detects the wall surface or the obstacle.

In step 104, the self-propelled cleaning device 1 is positioned such that the wall surface or obstacle is at the right side relative to the direction of advance, and it tracks around the wall surface or the obstacle along the wall surface or obstacle. At the same time, the indicator "wall surface" is written in the map information 41 database corresponding to the position where the wall surface or obstacle was detected while the self-propelled cleaning device 1 was traveling. The tracking around the wall surface is used for accurately obtaining information on the configuration of the wall surface, thus increasing the travel accuracy during cleaning.

When tracking the wall surface or the obstacle, the self-propelled cleaning device 1 is positioned at a fixed distance away from the wall surface or obstacle as based on the distance between the side proximity sensor 12 and the wall surface or obstacle detected by the sensor 12. The distance to the wall surface or obstacle is to be as short as possible, depending on the precision of the side proximity sensor 12. The suction inlet moving mechanism 16 moves the suction inlet to the right side of the body 2, and thus cleaning is possible up to the area close to the wall surface or obstacle. When the front proximity sensor 11 detects a wall surface or obstacle while the self-propelled cleaning device 1 is in motion, the self-propelled cleaning device 1 is rotated to the left. When the right side surface of the self-propelled cleaning device 1 approaches a wall surface or obstacle, it moves along the wall surface or obstacle.

While the self-propelled cleaning device 1 is in motion, the angular velocity that the gyro 10 detects is integrated, and the orientation angle Q in the direction is determined. The amount of movement and the direction of movement of the self-propelled cleaning device 1 are determined as vector amounts, using the movement distance and the orientation angle detected by the left and right rotary encoders 15a and 15b. This movement vector amount is integrated and the position of the self-propelled cleaning device 1 is determined. In step 104, the initial position and the current position are compared from time to time, and when the difference between the initial position and the current position is within a prescribed range, the self-propelled cleaning device 1 is considered to have completed one lap. Thus the self-propelled cleaning device 1 has a wall surface finding means so that the obstacles 31 and 32 are not mistakenly identified as part of the wall surface 20. In the preparatory operations, the location where the self-propelled cleaning device 1 is to be first placed in order to carry out cleaning is not set. Thus, in step 102, it is not known whether the self-propelled cleaning device 1 has approached the wall surface 20 or the obstacles 30 or 31.

In step 105, the direction of orientation angle Q1, which changed during motion of the self-propelled cleaning device 1, is checked. If the orientation angle changes by rotation to the right (clockwise rotation), then the next step is step 106, but if the rotation is to the left (counterclockwise rotation), then the next step is step 107. In step 106, the self-propelled cleaning device 1 is randomly rotated to the right side between 45° and 135°, and then the above steps 101 to 105 are repeated. When the change in the orientation angle is in the counterclockwise direction, in step 107, the self-propelled cleaning device 1 travels along the wall surface 20 to the right, and, when it reaches a corner, it continues to travel until it turn the corner.

In FIG. 6, the self-propelled cleaning device 1 is placed so as to face the wall surface segment 21. Thus, if the cleaning device advances straight ahead in accordance with step 102, the self-propelled cleaning device 1 will take path 201 to approach the wall segment 21. Subsequently, in steps 103 and 104, the self-propelled cleaning device 1 takes path 202 and makes a lap around the wall surface. While the self-propelled cleaning device 1 makes a lap around the room 30, the orientation angle Q is calculated and rotated 360° to the left (counterclockwise). As a result, in step 105, a determination to proceed to step 107 is made.

Figure 7:
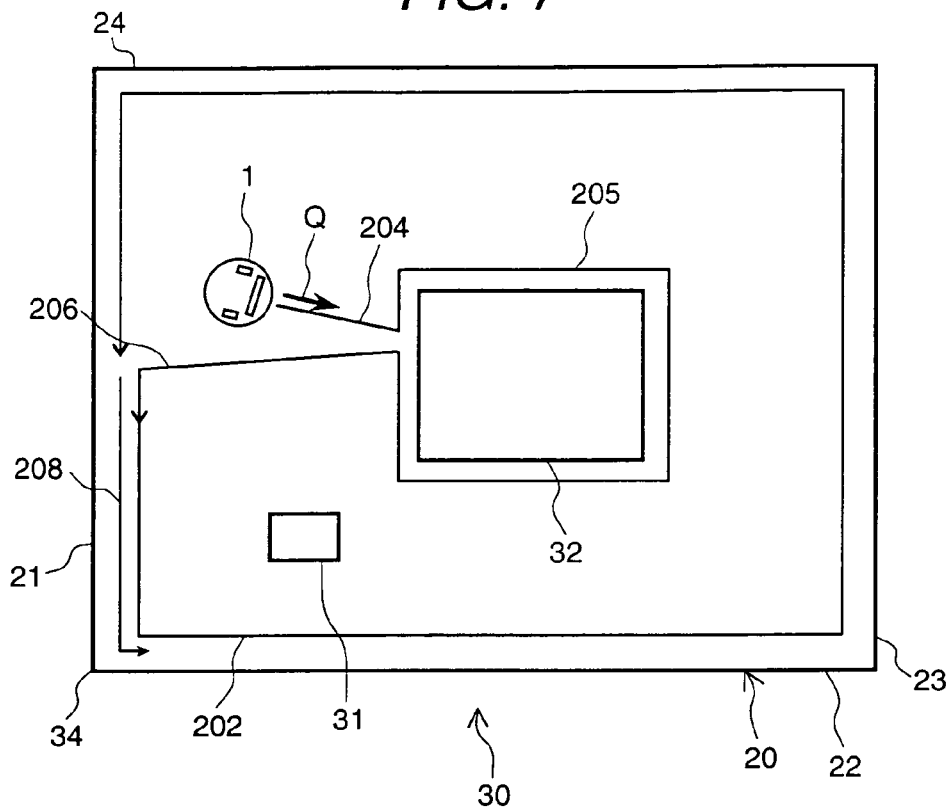

Unlike the example described above, as shown in FIG. 7, when the self-propelled cleaning device 1 is placed initially so as to face the obstacle 32, so that the self-propelled cleaning device 1 advances straight ahead taking the path 204 in step 102, the self-propelled cleaning device 1 approaches the obstacle 32. In addition, in accordance with steps 103 and 104, the self-propelled cleaning device 1 tracks around the obstacle 32 taking the path 205. The orientation angle Q of the self-propelled cleaning device 1 is calculated while tracking around the obstacle 32, being rotated 360° to the right (clockwise). Thus, in step 105, a determination is made to proceed to step 106. As a result, the self-propelled cleaning device 1 is rotated to the left, in a direction away from the obstacle 32.

Because the self-propelled cleaning device 1 has moved away from the obstacle 32, the wall surface is found in accordance with step 101a second time. At this time, the self-propelled cleaning device 1 advances on paths 206 and 202 in accordance with steps 102 to 104, and tracks around the wall surface 20, and then the process ends. In this method, the wall surface 20 is never confused with the obstacles 30 and 31, and this ensures that the wall surface 20 will be found. It is to be noted that, even if right tracking is selected, the wall can be found by the same steps.

Because step 107 has been carried out, the self-propelled cleaning device 1 is positioned at the end of one of the wall surface segments 21-24. In addition, the advancing direction of the self-propelled cleaning device 1 is a direction along the wall surface segments. In FIG. 6, the self-propelled cleaning device 1 advances to the corner 34 of the room 30 taking the path 203 and is positioned at the end of the wall surface segment 22.

Once the preparatory operations are complete, the cleaning begins using the algorithm shown in FIG. 4. First, in step 108, the dust collecting device 4 is actuated, and dust on the floor surface is sucked up from the suction inlet 3. At this time, the current position is stored in the recording means as the cleaning start point 36. The dust collecting device 4 also may be actuated at the beginning of, or in the middle of, the preparatory step.

In step 109, the reference orientation QS is the advancing direction that is detected by the gyro 10. That is to say, it is set to be the direction of the wall surface segment along which the self-propelled cleaning device 1 is moving. The reference orientation QS is the reference direction that will determine the path of movement. If, rather than setting the current advancing direction as the reference direction QS, the direction of the wall surface segment which the self-propelled cleaning device 1 is currently tracking is extracted from the "wall surface" information stored in the map information 41 and the extracted direction is set as the reference direction QS, a more precise reference orientation can be obtained.

In step 110, initial setting of the approach path reference line LA and the return path reference line LB is carried out. The approach path reference line LA and the return path reference line LB are imaginary lines that are used to control the travel path of the self-propelled cleaning device 1. The approach path reference line LA is perpendicular to the reference direction QS (the wall surface segment 22 direction in FIG. 1), and the position L4 is set as LA so as to be separated by half of the distance of the width WS at which the self-propelled cleaning device 1 has advanced along the reference direction QS from the present position. The return path reference line LB is a line positioned in the direction opposite to the reference direction QS, and it is set at a position L1, which is disposed in parallel to and separated by the distance of the width WL from the approach path reference line LA.

In this embodiment, the travel path of the self-propelled cleaning device 1 is in the form of a rectangular travel loop, and the length of the travel loop at the reference direction QS side is the loop width WL. The advancing width WS is the value of the distance between two continuous travel loops, minus the overlap between the two travel loops. The loop width WL is preferably an odd number multiple of half of the advancing width WS, or $WL=(2n+1)WS/2$, where n is a positive integer and, in FIG. 1, the loop width WL is set at 3/2 times the advancing width WS, or $WL=3WS/2$.

In steps 111 and 121 described below, the cleaning device 1 travels on a looped travel path that includes a pair of opposing paths. These opposing paths are the first and second horizontal movement paths that are disposed along the wall surface segments 22 and 24, and the first and second vertical paths that intersect the first and second horizontal paths. When the cleaning device 1 travels along the horizontal movement path, this is called approach motion and return motion. In the approach and return motions, the cleaning device 1 travels to the edge of the wall surface segments 22 and 24.

If an obstacle is detected while traveling on the looped travel path, the obstacle is avoided by traveling along the right side of the obstacle. More specifically, if the cleaning device 1 is an in approach motion, it goes back to the approach path reference line LA, and then continues the approach motion. Similarly, if the cleaning device 1 is in a return motion, it goes back to the return path reference line LB and then continues the return motion. If an obstacle is avoided in the approach motion and the return path reference line LB is reached, the cleaning device 1 switches to the return motion and goes back to the wall surface segment 22. It is to be noted that the approach path reference line LA and the return path reference line LB are imaginary wall surfaces, and the approach path reference line LA and the return path reference line LB may be such that motion is along the actual wall surface and obstacles.

In step 111, the self-propelled cleaning device 1 does right-tracking of the wall surface 20 until it reaches the approach path reference line LA or the return path reference line LB. That is to say, the self-propelled cleaning device 1 takes path 211 along the wall surface segment 22, and it then moves to the position L4 of the approach path reference line LA. At the time, the position detected by the gyro 10 and the rotary encoders 15a and 15b is stored in the memory as the recorded path 42. For the region where the self-propelled cleaning device 1 has traveled and which has been cleaned, the map information 41 data which reads "unconfirmed", is written over to read "cleaned". In steps 115, 116, 118 and 120, which are described below, the indicator is written over in the same manner.

In step 112, a determination is made as to whether or not the approach path reference line LA has been reached. When a determination has been made that the approach path reference line LA has been reached is made, the process goes to step 113. If approach path reference line LA has not been reached, the process goes to step 118. In steps 113 and 114, the orientation angle Q1 of the recorded path 42, which was recorded when the self-propelled cleaning device 1 traveled in step 111, is compared with the orientation angle Q2 recorded in the map information 41, and any detected error in the orientation angle Q is corrected.

Figure 8:
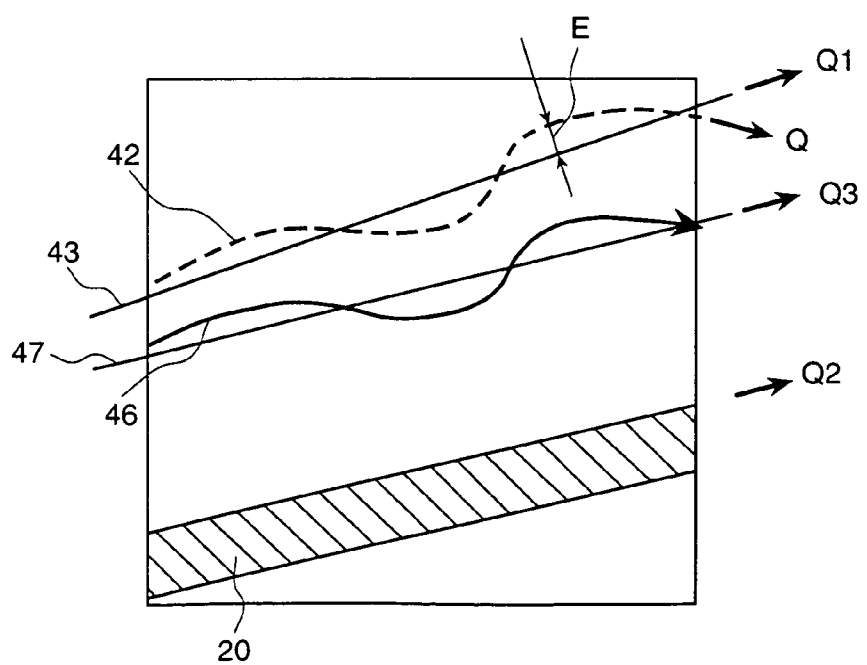

FIG. 8 shows an enlarged portion of the travel path which the self-propelled cleaning device 1 takes along the wall surface 20. It shows the same location shown in the map information of FIG. 5. Because the self-propelled cleaning device 1 travels along the wall surface 20, the orientation angle Q3, which is obtained by approximating to a straight line the path 46 on which the self-propelled cleaning device 1 actually travels, is equal to the orientation angle Q2 of the wall surface 20. However, due to detection error in the detected orientation angle Q, there maybe some difference between the orientation angle Q1 of the recorded path 42 which was stored when the self-propelled cleaning device 1 traveled in step 111 and the actual travel orientation angle Q3. As a result, there are some cases where the direction Q1 of the recorded path 42 and the direction Q2 are not the same. This difference is corrected in steps 113 and 114.

In step 113, a determination is made as to whether or not the recorded path 42, which was stored in memory, is approximately a straight line. Due to unevenness of the wall surface, or side proximity sensor error or shaky motion control, the recorded path 42 may be a curve. In the case where there is a large bend in the recorded path 42, the correct direction cannot be obtained. When the deviation E of the recorded path 42 is within a preset range and can thus be considered a straight line, the process goes to step 114, and the detection error for the orientation angle Q is corrected. When the recorded path 42 cannot be considered a straight line, the detection error for the orientation angle Q is not corrected and the process proceeds to step 115. When a determination is made that there is a deviation, the recorded path 42 shown at the point of separation is approximated to a straight line to thereby obtain the average path 43. In addition, the deviation E of the recorded path 42 from the average path 43 is calculated.

In step 114, the value in memory for the orientation angle Q1 of the average path 43, when the self-propelled cleaning device 1 travels along the wall surface and the orientation angle Q2 of the wall surface that is stored in the map information 41 are continually used to correct the stored orientation angle value Qm. More specifically, the deviation between the orientation angle Q1 and the orientation angle Q2 (Q1−Q2) is added to the previously stored orientation angle value $Qm_i$, and it is stored as the new stored value Qm ($=Qm_{i+1}=Qm_i+Q2-Q1$). As shown in FIG. 5, when the orientation angle Q2 is obtained from the map information 41, the wall surface mark 44, which approximates the recorded path 42 that is stored in the map information 41, is extracted. The average wall surface 45, which is obtained by approximating the wall surface mark 44 to a straight line, and the orientation angle Q2 from the incline of the average wall surface 45 is calculated. In this embodiment, the recorded path 42 that is measured when the self-propelled cleaning device 1 moves along the wall is used in correcting the orientation angle. At that time, the distance from the side of the wall is made long, and the effects of unevenness and the like is reduced.

In step 115, the self-propelled cleaning device 1 travels on the approach path reference line LA until it reaches the wall surface or an obstacle. In the example shown in FIG. 1, the self-propelled cleaning device 1 travels on the path 212 until it reaches the wall surface segment 24. When the wall surface segment 24 is reached, it does right-tracking of the wall surface or obstacle until it reaches the approach path reference line LA or the return path reference line LB or goes back on the recorded path 42 (Step 116). During this motion, the "obstacle" mark is recorded in the map information 41 at those places where the wall surface or obstacle was detected. However, this is only in the case where the wall surface information in the map information 42 reads "unconfirmed". This recorded operation is also carried out in step 120.

In the motion shown in FIG. 1, the return path reference line LB of the first loop is the line L1 outside of the wall surface segment 21, and thus the self-propelled cleaning device 1 travels along the wall surface segment 24 taking path 213, and it reaches the wall surface segment 21. Because the position on the wall surface segment 22 is on path 211, which is the current recorded path 42, step 116 ends.

In step 117, a determination is made as to whether or not the self-propelled cleaning device 1 has reached the approach path reference line LA. If the self-propelled cleaning device 1 has reached the approach path reference line LA, the process advances to step 122. In the case where the self-propelled cleaning device 1 has not reached the approach path reference line LA, the self-propelled cleaning device 1 travels to the right of the wall surface or the obstacle until the self-propelled cleaning device 1 reaches the approach path reference line LA or returns to the recorded path 42 (Step 120).

Step 121 is the step where a determination is made as to whether or not the self-propelled cleaning device 1 has returned to the recorded path 42, and if it has returned to the recorded path 42, the process goes to step 122. If the self-propelled cleaning device 1 has not returned to the recorded path 42, step 118 is next. In the first loop shown in the travel path example of FIG. 1, in step 16, the recorded path 42 has already been reached, and thus the self-propelled cleaning device 1 does not move from that position, but proceeds from step 117 to steps 119 and 122.

If the point on the recorded path 42 is reached, the approach path reference line LA and the return path reference line LB are moved forward in the reference orientation QS direction by the amount of the width WS in order to create a new loop in step 122, and they are positioned at L3 and L6 respectively. The advance width WS is between one and two times the width of the suction inlet 3. The steps 111 to 117 are repeated. At this time, approach path reference line LA and return path reference line LB are set at L1-L17.

In the spiral motion, the approach path reference line LA and the return path reference line LB are moved by the advance width WS each time, and the loop width WL, which is the distance between both reference lines, is set to be half of an odd number multiple of the advance width WS. As a result, the approach path reference line LA and the return path reference line LB never overlap. The approach path reference line LA and the return path reference line LB appear alternately at half of the distance of the advance width WS, and thus the approach path reference line and the return path reference line do not overlap and there is no multiple cleaning of the same region.

Because the travel distance WS of the self-propelled cleaning device 1 is half of the advance distance WS, in order to carry out the most effective cleaning, the advance distance WS should be less than twice the width of the suction inlet 3. However, since there is the possibility that regions for cleaning may be missed due to travel error, the advance width WS is preferably less than twice the width of the suction inlet 3. Thus, the advance distance WS is set to be between one and two times the width of the suction inlet 3.

It is to be noted that in the above embodiment, at the time of the second spiral motion, when the self-propelled cleaning device 1 is traveling on the approach path reference line L6, it abuts the obstacle 31. At this time the self-propelled cleaning device 1 does right-tracking of the obstacle, and it moves away from the approach path reference line L6. However, during the right tracking (path 223), after returning to the position of the approach path reference line L6, it travels on the approach path reference line L6 (path 224). There are many small obstacles in the room, such as chair legs, but these are avoided by going around them. The self-propelled cleaning device 1 continues to travel along the wall surface segment 24 (path 225) and on the position L3 on the return path reference line LB, and then goes back to the wall surface segment 22.

In addition, at the time of the fifth spiral motion, when the self-propelled cleaning device 1 is traveling on the approach path reference line L12 (path 252), it abuts the obstacle 32. At this time, the self-propelled cleaning device 1 does right-tracking (path 253) of the obstacle in the same manner as the second spiral motion. However, because the obstacle 32 is large, the return path reference line LB position is reached before the self-propelled cleaning device 1 goes around the opposite side of the obstacle 32. Thus, the approach motion is aborted and a transfer is made to the return motion (path 254).

In this case, the area behind the side toward the obstacle is left unclean. However, after one cleaning in which the motion reference line is changed from L1 through L17 is complete, the map information 41 is used, the uncleaned regions are identified and if the same method as that described above is used, the uncleaned regions can be reduced. In the case of an obstacle that is larger than the loop width WL, efficient cleaning is possible in this method in which the path around the obstacle is shortened.

In step 123, a determination is made as to whether or not the spiral motion is complete. If the repetition of the spiral motion has begun and the approach path reference line LA and the return path reference line LB have moved to the outside of the wall surface segment 23, the self-propelled cleaning device 1 cannot be made to travel any further. In this case the spiral motion is determined to be complete. This determination is performed by checking whether or not the previous circular travel path is within the newly created loop. In addition, when the new loop does not include the previous travel path, the spiral motion is determined to be complete. When the spiral motion is complete, the process goes to step 124, and if the spiral motion is not complete, the process returns to step 111.

Because the spiral motion is complete in step 124, the self-propelled cleaning device 1 does right-tracking of surface 20, turns the corner and transfers to the wall surface segment 23. Step 125 checks to determine if the current position is the cleaning start point 36. If it is not the cleaning start point, steps 109-124 are repeated. However, the map information 41 is referred to and unnecessary motion is not performed. Before each spiral motion, the map information 41 is referred to. Also, when there are no regions that are marked "unconfirmed" on the second horizontal travel path, the second horizontal travel path is brought close to the first horizontal travel path. When there are no regions that have been marked "unconfirmed" in all of the spiral travel paths, spiral motion is not performed and wall surface tracking continues. As a result, the spiral motion on the wall surface segment is along the path shown by the broken line in FIG. 1. Unnecessary motion is reduced and the cleaning can be done quickly.

When the spiral motion for the wall surface segment 23 is complete, similar spiral motion is carried out for wall surface segment 24 and 21. In this embodiment, there are no uncleaned regions and thus the self-propelled cleaning device 1 is simply transferred to the wall surface segments 24 and 21, and returned to the cleaning start point 36. Because the self-propelled cleaning device 1 has returned to the cleaning start point 36, the process goes to step 126, and the dust collecting device 4 stops. According to this invention, in the spiral motion along the wall surface segment 22, the portion that is left uncleaned due to it being close to the obstacle, can also be cleaned. When the dust collecting device 4 stops, cleaning by the self-propelled cleaning device 1 ends.

In this embodiment, the self-propelled cleaning device is moved along the wall surface, and the reference direction for movement is determined. This is then compared with the wall surface direction on the map information which was obtained before-hand, and the orientation angle Q is corrected. Thus, deviation of the travel direction of the self-propelled cleaning device is reduced. Because there is only a small deviation in the travel direction, the width of the region that is subjected to multiple cleaning is reduced, and thus the efficiency of the cleaning is improved. Because the orientation angle Q is corrected frequently for each spiral motion of the self-propelled cleaning device, an orientation angle detection sensor with high-precision is not necessary, and thus a low cost sensor can be used.

In the above-described embodiment, the gyro 10 may be used for the orientation angle detection sensor; or, the gyro 10 may be omitted, and the difference in the rotation speed of the right and left wheels 5a and 5b obtained from the output of rotary encoders 15a and 15b may be obtained, and the orientation angle Q detected from the difference in speed. In this case, the cost is reduced by the cost of the gyro.

In finding of the wall surface and the spiral motion, just one side surface of the cleaning device 1 may travel alongside the wall surface or the obstacle, so there can be just one side detector sensor 12, and by reducing the number of sensors, control is facilitated, and the cost is also made lower. In addition, the suction inlet 3 that cleans the wall edge may project only in one direction, and thus the suction inlet moving mechanism can be simplified. When the self-propelled cleaning device 1 has brushes for cleaning the wall edges and the like, they only need to be attached in one direction. Thus, the cost of the self-propelled cleaning device 1 can be reduced, and it can be made more compact.

In this embodiment, even when the obstacle is smaller than the width of the spiral travel loop, even the side opposite to the obstacle can be cleaned since the self-propelled cleaning device 1 circles around the obstacle. Also, for obstacles that are larger than the width of the travel loop, the cleaning region is divided into a region at the front side of the obstacle and a region at the back side of the obstacle. The front side is cleaned in one series of spiral motion, while the back side is cleaned at the time another wall surface segment is being cleaned. Thus, no uncleaned regions remain, and the cleaning is speedy.

It is to be noted that in this embodiment, the self-propelled cleaning device 1 first tracks around the wall surface, and information on the wall surface is rewritten in the map information. Next, the orientation angle Q is corrected based on the written information. However, the first tracking around the wall surface and creation of the map information 41, which are part of the initial preparatory operations, may be omitted. In the absence of this type of base information, the reference direction QS may be used instead of Q2 in step 114. The first and second vertical travel path can always be corrected so as to be parallel to the wall surface, thus being a reference for wall surface 20, so the travel path can be simply set. When all four walls in a room are straight, the room can be cleaned by this method without any uncleaned regions remaining.

In the above embodiment, the self-propelled cleaning device has a remote control, but an operating device on the body may replace the remote control. The self-propelled cleaning device may also have a means for eliminating the dust collected in the dust collecting device, or a means for charging the battery of the self-propelled cleaning device. Further, the self-propelled cleaning device may be controlled by programming, so that it can be operated by a timer whether or not an operator is present. It may also be operable by internet or cell phone terminals. In any case, in accordance with this invention, the self-propelled cleaning device can clean any region that needs to be cleaned, and thus, an operator does not necessarily need to be present.

In accordance with this invention, the reference orientation of the self-propelled cleaning device is set at the time of wall surface tracking, and the self-propelled cleaning device travels in a spiral using the reference orientation. Thus, cleaning is speedy and the area regions left uncleaned are reduced.

What is claimed is:

1. An autonomous self-propelled cleaning device comprising:
    a moving means for moving the cleaning device;
    a driving means for driving said cleaning device;
    a control means for controlling the moving means;
    an orientation angle detection means for detecting an orientation angle of the cleaning device;
    a wall surface detection means which is capable of detecting a wall surface in a position at one side of the cleaning device;
    wherein the control means determines rectangular spiral travel paths based on an orientation angle detected by the orientation angle detection means and causes the cleaning device to travel along the rectangular spiral travel paths for cleaning a room including travel alongside the wall surface which partitions the room to be cleaned and which is detected by the wall surface detection means, and
    the driving means drives the cleaning device such that it moves along the travel path;
    wherein the rectangular spiral travel paths are in a form of continuous loops which at least partially overlap with each other.

2. A self-propelled cleaning device described in claim 1, comprising an obstacle detection means for detecting an obstacle at a position in front of the cleaning device, and if the obstacle detection means detects an obstacle on the travel path, the control means controls the moving means such that the obstacle is avoided.

3. A self-propelled cleaning device described in claim 2, wherein the control means controls the moving means such that if the obstacle detection means detects an obstacle in the advance direction of the cleaning device, the cleaning device moves alongside the right-side or left-side of the obstacle such that the obstacle is avoided.

4. A self-propelled cleaning device described in claim 1, comprising a map recording means capable of storing information on the region for cleaning, in which the control means determines a rectangular travel path based on the information recorded in the map recording means.

5. A self-propelled cleaning device described in claim 1, wherein the rectangular spiral travel path comprises:
    a first horizontal movement path for moving to a predetermined position alongside to the wall surface;
    a first vertical movement path being arranged orthogonally with the first horizontal movement path and for moving to an opposite wall surface to the wall surface of the first horizontal movement path;
    a second horizontal movement path being arranged in a reverse direction to the first horizontal movement path alongside to the wall surface which is opposite to the wall surface of the first horizontal movement path and for moving a distance shorter than the first horizontal movement path; and
    a second vertical movement path being arranged orthogonally with the second horizontal movement path and for moving to the wall surface of the first horizontal movement path.

6. A self-propelled cleaning device described in claim 5, wherein the cleaning device makes spiral loops comprising the first horizontal movement path, the first vertical movement path, the second horizontal movement path, and the second vertical movement path until the cleaning device returns to a start position.

7. A method for operating a self-propelled cleaning device capable of autonomous movement, comprising the steps of:
    causing the cleaning device to travel along a plurality of looped travel paths including travel routes along a pair of opposing wall surfaces;
    detecting a reference direction for the self-propelled cleaning device on at least one of the travel routes along the wall surface; and
    determining a travel path other than the travel routes along the wall surface based on the reference direction;
    wherein the plurality of looped travel paths are continuous loops which at least partially overlap with each other.

8. A method for operating a self-propelled cleaning device described in claim 7, wherein the looped travel path comprises a first vertical movement path that is substantially orthogonal with respect to the travel route along the wall surface, and a second vertical movement path, and the interval between these two movement paths is an odd-number multiple of half of the interval between the two adjacent looped travel paths.

9. A method for operating a self-propelled cleaning device described in claim 7 wherein the interval between the two adjacent looped travel paths is between 1 and 2 times the width cleanable by the cleaning means.

10. A method of operation for a self-propelled cleaning device comprising a moving means for moving on the floor surface; a control means for controlling the moving means; and a cleaning means for cleaning the floor surface, wherein said method of operation comprises the steps of:
    finding the wall surface prior to the start cleaning using one of right-side tracking and left-side tracking alongside the wall surface; and
    cleaning, when the wall surface is found, based on information detected by an orientation angle detection means for detecting the orientation angle of the cleaning device, and a wall surface detection means for detecting the position of the wall surface, and which takes a plurality of spiral travel paths which partially overlap with each other;

wherein the plurality of spiral travel paths are in the form of continuous loops which at least partially overlap with each other.

11. A method for operating a self-propelled cleaning device described in claim 10, wherein the spiral travel path comprises: a first horizontal movement path alongside a first wall surface segment of the wall surface; a first vertical movement path that is continuous with the first horizontal path; a second horizontal movement path that is continuous with first vertical movement path alongside the second wall surface segment opposing the first wall surface segment and; a second vertical movement path that is continuous with the second horizontal movement path.

12. A method for operating a self-propelled cleaning device described in claim 10, wherein when the cleaning device travels on at least the first or second horizontal movement path, the orientation angle detection means detects the orientation angle, and sets the direction of the first and second vertical movement path based on the detected orientation angle.

13. A method for operating a self-propelled cleaning device described in claim 12, wherein the orientation angle is continually corrected using the orientation angle detected by the orientation angle detection means when the cleaning device is caused to travel on the first horizontal movement path and the orientation angle of the first wall surface segment stored in the map recording means that stores wall surface information.

14. A method for operating a self-propelled cleaning device described in claim 13, wherein the cleaning device tracks around the wall surface before cleaning begins, and wall surface information is stored in the map recording means based on the wall surface information detected at the time of tracking.

15. A method for operating a self-propelled cleaning device which uses an orientation angle detection means and a wall surface detection means which detects wall surface to clean regions enclosed by a plurality of wall surface segments, said method comprising:

a first step of moving the cleaning device until it approaches the obstacle or the wall surface segment;

a second step of moving the cleaning device such that one of the right-side and left-side of the cleaning device approaches the object, and then tracking the cleaning device around the object;

a third step of comparing the direction of the accumulative variation of the orientation direction detected by the orientation direction detection means with the direction of the side of cleaning device approaching the object in the second step, selecting the result of comparison to be equality when the first direction is clockwise and the second direction is a right-side, or the first direction is counterclockwise and the second direction is a left-side; and a fourth step of rotating the cleaning device by a prescribed angle and repeating the process from the first step when the result of comparison in the third step is equality;

wherein the cleaning device is moved along rectangular spiral travel paths in a form of continuous loops which at least partially overlap each other.

16. An autonomous self-propelled cleaning device having a main body, a movement means for moving the main body on a floor surface, a control means for operating the movement means and for controlling the movement of the main body, a cleaning means provided on the main body and for cleaning the floor surface, an orientation angle detection means for detecting an orientation angle of the main body, and a wall surface detection means for detecting a relative position of the wall surface to the main body, and a region enclosed by a plurality of wall surface segments is cleaned, wherein the control means comprises wall surface search means which has a first step of moving the main body until it approaches an obstacle, a second step of moving the main body such that the main body approaches to the obstacle in a prescribed side direction to an advance direction of the main body and tracking the main body around the obstacle, a third step of comparing the direction of accumulative variation of the main body detected by the orientation angle detection means in the tracking-around movement with the prescribed direction, and a fourth step of rotating the main body by a prescribed angle and repeating the process from the first step when the result of comparison in the third step is equality, and wherein the cleaning device is moved along rectangular spiral travel paths in a form of continuous loops which at least partially overlap each other.

* * * * *